US 6,231,908 B1

United States Patent
Lelieveld et al.

(10) Patent No.: US 6,231,908 B1
(45) Date of Patent: *May 15, 2001

(54) METHOD AND APPARATUS FOR PRESERVING FOOD PRODUCTS

(75) Inventors: Hubertus Leonardus Lelieveld; Alexandru Volanschi, both of Vlaardingen (NL)

(73) Assignee: Lipton, Division of Conopco, Inc., Englewood Cliffs, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/433,163

(22) Filed: Nov. 3, 1999

(30) Foreign Application Priority Data

Nov. 4, 1998 (EP) .................................. 98203716

(51) Int. Cl.⁷ ...................................... A23L 3/015

(52) U.S. Cl. .................. 426/237; 426/241; 426/665; 422/22; 422/33; 422/295; 422/296; 99/451; 99/473

(58) Field of Search .................. 426/237, 238, 426/239, 241, 665; 422/33, 22, 295, 296; 99/451, 473

(56) References Cited

U.S. PATENT DOCUMENTS

| 4,612,199 | * | 9/1986 | Miyahara | 426/237 |
| 4,838,154 | | 6/1989 | Dunn et al. | 99/451 |
| 5,232,726 | * | 8/1993 | Clark et al. | 426/519 |
| 5,514,391 | | 5/1996 | Bushnell et al. | 426/237 |

(List continued on next page.)

FOREIGN PATENT DOCUMENTS

| 0 434 558 A2 | 6/1991 | (EP) . |
| 0 457 179 A1 | 11/1991 | (EP) . |
| 60-120970 | 6/1985 | (JP) . |
| WO 90/15547 | 12/1990 | (WO) . |
| WO 97/43914 | 11/1997 | (WO) . |
| WO 00/15054 | * 3/2000 | (WO) . |

OTHER PUBLICATIONS

"Inactivation of *Bacillus subtilis* endospores by UHP in combination with other treatments", Heinz et al. IFT Annula Meeting 1995; Dep. of Food Scie., Univ. of Tech, D–14195 Berlin Germany p. 268.*

(List continued on next page.)

*Primary Examiner*—Nina Bhat
(74) *Attorney, Agent, or Firm*—James J. Farrell

(57) ABSTRACT

In a method of preserving a food product by applying high pressure, the food product (1) is forced through a treatment system (2) having an entrance (3) and an exit (4) while a pressure difference of at least 10 MPa is substantially maintained between the entrance and the exit. The product (1) is subjected to a varying electric and/or magnetic field. A treatment system with a plurality of treatment chambers is used, wherein the treatment chambers are electrically connected to reduce impedance variations of the treatment system during the preserving of the food product. For the food product flow the treatment chambers are series connected. An apparatus (10) for preserving food products comprises at least one treatment system (2) having an entrance (3) and an exit (4), a high-pressure generating means (11) for forcing a product (1) through the treatment system, while substantially maintaining a pressure difference of at least 10 MPa between the entrance and the exit, and means (5) for generating a varying electric and/or magnetic field and for subjecting the product to the varying electric and/or magnetic field. The treatment system comprises a plurality of treatment chambers (2) which are electrically interconnected to reduce impedance variations of the treatment system and which are series connected for the food product flow.

13 Claims, 3 Drawing Sheets

U.S. PATENT DOCUMENTS

| | | | |
|---|---|---|---|
| 5,690,978 | | 11/1997 | Yin et al. .............................. 426/237 |
| 5,837,303 | | 11/1998 | Hayden ................................ 426/237 |
| 6,017,572 | * | 1/2000 | Meyer .................................. 426/521 |
| 6,033,717 | * | 3/2000 | Agterof et al. ...................... 426/665 |

OTHER PUBLICATIONS

"The heat is off", Byrne, Food Engineering International, (1993) 18(1) p. 34–38.*

* cited by examiner

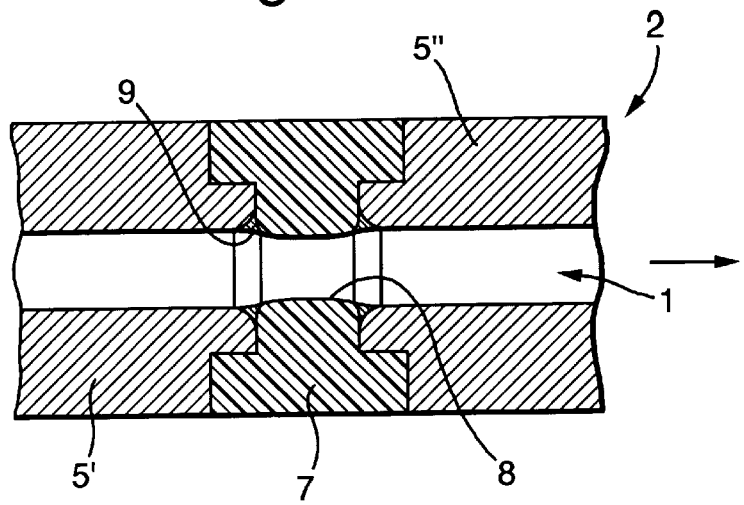
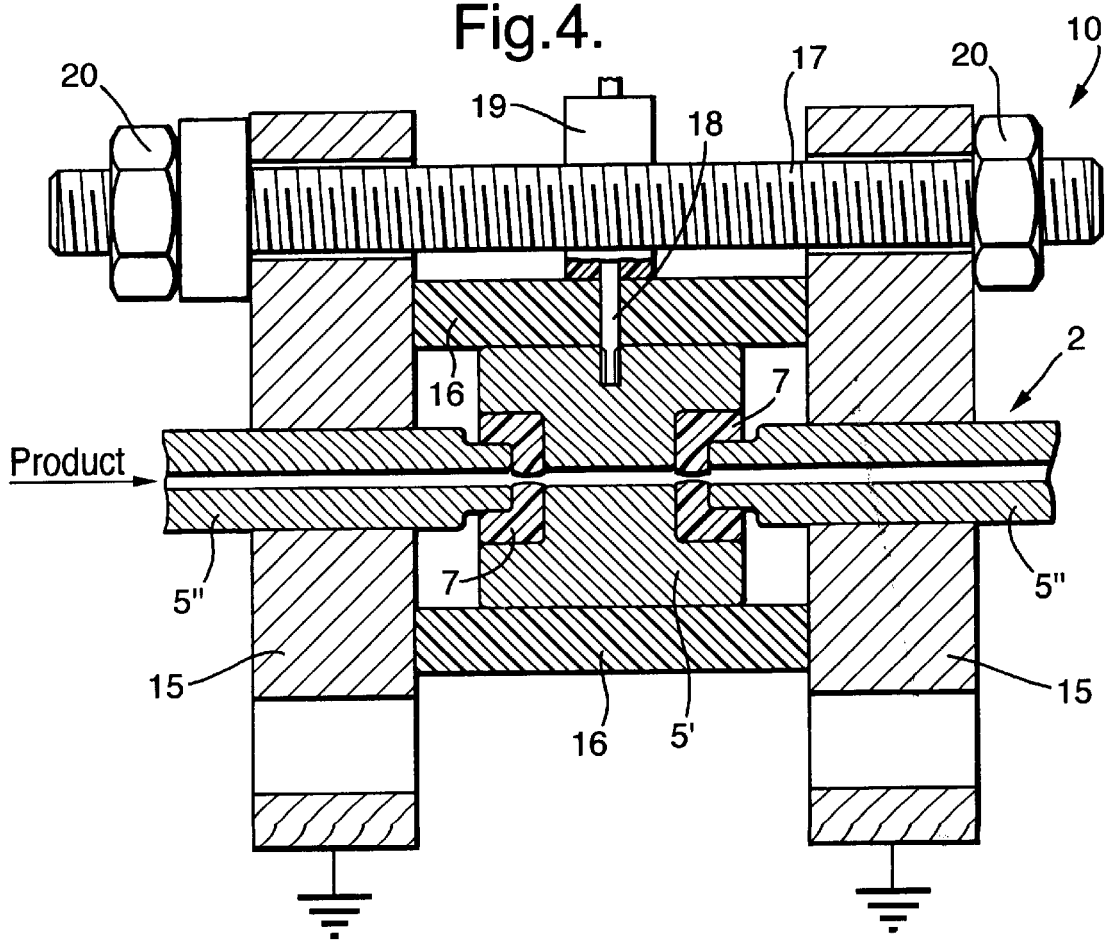

METHOD AND APPARATUS FOR PRESERVING FOOD PRODUCTS

BACKGROUND OF THE INVENTION

The present invention relates a method of preserving a food product, wherein the food product is forced through a treatment system having an entrance and an exit while a pressure difference of at least 10 MPa is substantially maintained between the entrance and the exit, wherein the product is subjected to a varying electric and/or magnetic field, and to an apparatus for preserving food products, comprising at least one treatment system having an entrance and an exit, a high-pressure generating means for forcing a product through the treatment system, while substantially maintaining a pressure difference of at least 10 MPa between the entrance and the exit, and means for generating a varying electric and/or magnetic field and for subjecting the product to the varying electric and/or magnetic field. "Entrance" and "exit" are herein to be understood as to describe the part where at least part of the treatment occurs. Prior to the entrance, there will be pressurising means, and prior to the pressurising means there will be a storage of food product which is to be preserved. Hence, the foodproduct to be preserved will go from storage, pressurising means, entrance, a phase of high pressure, pressure reduction, to an exit.

Such a method and apparatus are disclosed in International patent application WO 97/43914. Ultra-high pressure (UHP) preservation is a technique which allows micro-organisms in food products to be destroyed, or at least inactivated, without substantially increasing the temperature of the product. Thus, the disadvantages of heat treatments such as pasteurisation and sterilisation, often affecting the quality (taste, nutrients) of the product, are avoided. The pressures involved in UHP-preservation are extremely high, typically several hundred MPa. The method described allows a continuous process which especially in the food industry is particularly advantageous.

In the known apparatus, the treatment system includes one treatment chamber having a load impedance, wherein the means for generating the varying field has a characteristic impedance matched to the load impedance in order to obtain an optimal energy transfer from the generating means to the treatment chamber. However, an unwanted effect of the varying field is that the food product is also heated up during the treatment. Under normal operation, the heating of the product can reach 30° C. or more. Heating the product causes a decrease of the load impedance of the treatment chamber and this impedance change results in a temperature dependent mismatch of the load impedance and the characteristic impedance of the generating and subjecting means. This unwanted effect results in an energy transfer between the generating means and the treatment chamber which is temperature dependent.

SUMMARY OF THE INVENTION

It is an object of the present invention to overcome the problems of the prior art and to provide a method and apparatus for preserving food products which allow an even better preservation without increasing the required pressure.

It is another object of the present invention to provide a method and apparatus for preserving food products which allow a thorough inactivation of micro-organisms while maintaining the advantages of a continuous treatment.

Accordingly, these and other objects are met by a method of the above-mentioned kind which, according to the present invention, is characterized in that a treatment system with a plurality of treatment chambers is used, wherein the treatment chambers are electrically connected to reduce impedance variations of the treatment system during the preserving of the food product, and wherein the treatment chambers are series connected for the food product flow.

By subjecting the product to a varying electric and/or magnetic field in this manner load impedance variations caused by temperature increase of the food product during the preservation treatment can be minimised, so that the energy transfer between the generating means and the treatment system is significantly reduced. This guarantees an improved control of the preservation treatment.

In a preferred embodiment of the invention four treatment chambers are used, the treatment chambers being electrically connected in a Wheatstone bridge configuration. In this manner a compensation of the load impedance variation of the treatment chambers is obtained in a simple manner resulting in a load impedance of the treatment system which is less dependent of the food product temperature.

A dual treatment is achieved which even more efficiently inactivates both micro-organisms and spores. In order to obtain a sufficient UHP-effect the pressure difference between the entrance end and the exit end of the tube is preferably at least 100 MPa, possibly at least 300 MPa. However, due to the synergy between the pressure treatment and the electric field treatment, for the same degree of inactivation the required pressure is less than the one applied in the prior art process. Forcing the product through the treatment system and the step of subjecting the product to a varying electric field are preferably carried out simultaneously. In this way, the food product is subjected to two different treatments simultaneously, resulting in an optimal synergy of the two treatments. It is, however, also possible to apply the two steps one after the other.

In the method of the present invention, the varying electric field may be applied directly or be induced by a varying magnetic field, independently of the way the varying magnetic field is generated. A suitable method of generating a varying magnetic field for preserving food products is described in Dutch patent application PCT/EP99/0672 of the same Applicant. Alternatively, a varying magnetic field may be used instead of the varying electric field, or a combination of a magnetic and an electric field may be applied.

The present invention further provides an apparatus for preserving food products of the above-mentioned kind, characterized in that the treatment system comprises a plurality of treatment chambers which are electrically interconnected to reduce impedance variations of the treatment system and which are series connected for the food product flow.

Additionally, the present invention provides a food product which is preserved by the above-mentioned method.

BRIEF DESCRIPTION OF THE DRAWINGS

The invention will be further explained with reference the accompanying drawings.

FIG. 3 shows part of a second embodiment of an apparatus for preserving food products according to the present invention.

FIG. 4 shows part of the embodiment of FIG. 2 in more detail.

DETAILED DESCRIPTION OF THE PREFERRED EMBODIMENTS

Figure 1:
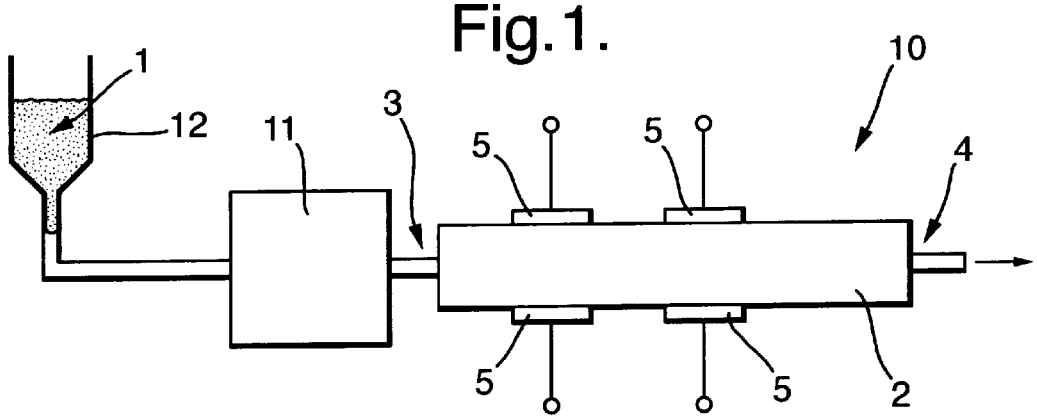
FIG. 1 schematically shows the principle of the present invention.

In the arrangement of FIG. 1, a preservation apparatus 10 comprises a high pressure pump 11 which is connected to a treatment chamber 2 which is made as a pressure tube. It is noted however that other types of treatment chambers can be used. A product 1 is passed from a container 12 to the pump 11 which subsequently feeds the product at an extremely high pressure, e.g. 10 or 100 MPa, to the entrance end 3 of the tube 2. The pump 11 and the tube 2 are dimensioned so as to maintain a pressure difference of at least 10 MPa, preferably at least 100 MPa, between the entrance end 3 and the exit end 4 of the tube 2. Reference is made to International patent application WO 97/43914, in which such a tube is described is more detail. Instead of a pump, other means for inducing a high pressure in the food product may be employed, such as a gas pressurised vessel.

According to the present invention, the effect of an UHP (ultra high pressure) treatment can be enhanced by also, preferably simultaneously, subjecting the food product to an electric field treatment. To this end, electrodes 5 are arranged at the tube 2. These electrodes 5 may be connected to a voltage source (not shown) which may provide a constant voltage (DC) or an alternating voltage (AC). By applying a varying electric field, an additional preserving effect is obtained.

The electrodes 5 may be arranged pairwise at opposite sides of the tube, as shown in FIG. 1, thus providing an electric field which is essentially perpendicular to the feeding direction of the product. Preferably, the electrodes constitute compartments (wall sections) of the tube 2, which compartments are electrically insulated by insulation parts. Such an arrangement is shown in FIG. 2.

Figure 2:
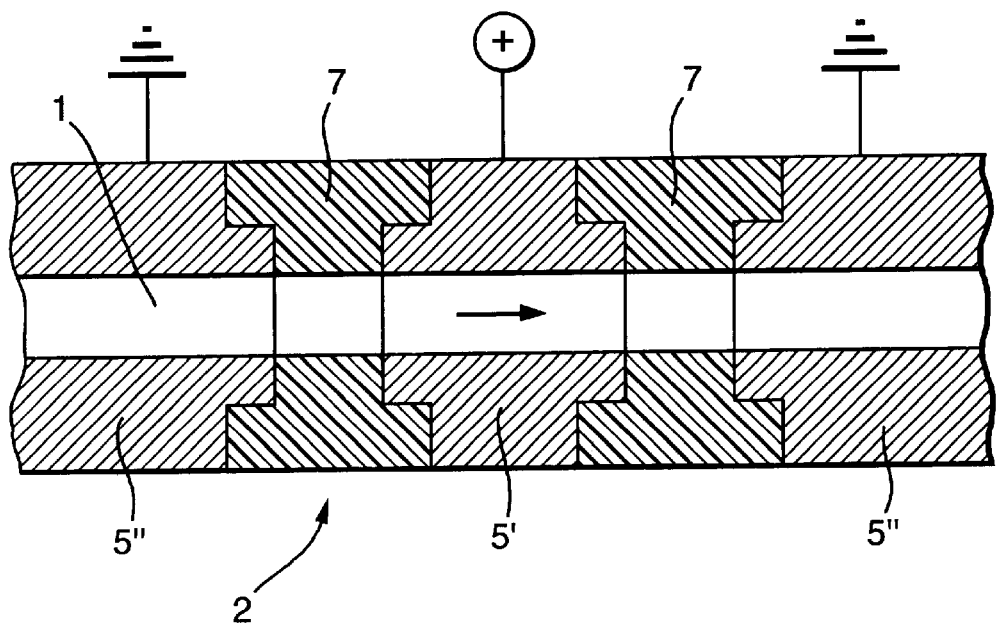
FIG. 2 shows part of a first embodiment of an apparatus for preserving food products according to the present invention.

The tube 2 of FIG. 2 comprises electrodes 5, separated by insulators 7. The electrodes are tube sections made out of e.g. metal or an electrically conductive ceramic material, whereas the substantially annular insulators are made of a suitable insulating material, such as reinforced plastic. The shape of the insulator sections and of the abutting parts of the electrode sections are chosen such that a pressure-resistant coupling of the various tube parts is made possible. In the embodiment shown, the insulating parts are narrower in the vicinity of the inner wall of the tube.

As shown in FIG. 2, a first electrode 5' is connected to a voltage source, which may be either a constant voltage source (DC) or an alternating voltage source (AC). The other electrodes 5" shown in FIG. 2 are both connected to ground. In this way an electric field may be generated which extends substantially parallel to the feeding direction of the product 1, i.e. lengthwise with respect to the tube. Food products passing through the tube undergo a varying electric field as they pass through the electrode sections 5 having different voltages. Thus, the food product can be subjected to a varying electric field due to its movement through the electrode sections having different voltages, even if the electrode 5' in FIG. 2 is connected to constant voltage source (DC). Accordingly, the present invention also provides a method and apparatus for subjecting food products to a varying electric field using a constant voltage source, even if no high pressure is supplied.

Even though the embodiment of FIG. 2 is mechanically simple and robust, the relatively sharp edges of the electrodes 5', 5" may generate flash-over between the electrode sections. That is, due to the concentration of the electric field in the edges facing the interior of the tube corners, sparks may cross the distance between the electrode sections, possibly causing damage to the tube. In order to overcome this problem, the edges of the electrodes may be rounded off, as shown in FIG. 3. To prevent the spaces between the rounded off edges and the insulators to become filled with the food product 1, these spaces are filled with a suitable filling material 9. Preferably, the filling material 9 has an electric permittivity which matches the electric permittivity of the product to be treated. Of course, the filling material 9 should be non-toxic and should not affect the flavour of the food product.

Also shown in FIG. 3 is that the insulator section 7 extends slightly into the interior of the tube, thus causing a local narrowing of the tube 2 at 8. This causes a mixing effect, possibly involving a circular flow, in the food product passing the insulator 7. As a result of this, the food product is more evenly subjected to the electric field, causing a more evenly applied micro-organism inactivating effect.

In the embodiments of FIGS. 2 and 3, all electrodes have equal diameters and constitute wall sections of the tube. It is of course possible for some electrodes to constitute wall sections of the tube, whereas other electrodes are mounted at the outside of the tube.

The embodiment shown in FIG. 4 is similar to the one shown in FIG. 3, in that adjacent tube sections constitute electrodes 5' and 5", which electrodes are separated by insulators 7. The insulators 7 have curved surfaces extending slightly into the interior of the tube so as to effectively narrow its diameter, as denoted by reference numeral 8 in FIG. 3.

In the embodiment of FIG. 4, the electrodes 5" connected to ground are contained by electrically conductive elements 15. Preferably, the electrodes (tube sections) 5" are fixed in the elements 15 by means of press-fitting. The support elements 15 enclose a substantially annular non-conductive spacer 16 and are connected by bolts 17, only one of which is shown for the sake of clarity. Nuts 20 engage the bolts 17. The electrode 5' is connected to a conductive lead 18, which is enclosed by a non-conducting insulator jacket 19. The lead 18 is, in turn, connected to a high voltage source (not shown) which produces a voltage ranging from approx. 1000 to approx. 100.000 V, possibly even more. The required voltage depends on the inner diameter of the tube at the high voltage electrode 5'. In order to achieve a field intensity of between approx. 100 V/mm and 10.000 V/mm at a diameter of e.g. 10 mm, a voltage ranging between 1000 V and 100.000 V is required.

The structure of the embodiment of FIG. 4 has several advantages. The high voltage electrode 5' is securely enclosed by the grounded support elements 15 and the non-conductive spacer 16. The support elements 15, to which the electrodes 5" are fixed, allow the use of the bolts 17 to firmly secure the structure and to resist the large forces brought about by the high pressure in the tube 2. Thus, a structure is obtained which is both mechanically and electrically safe.

The voltage source comprises an output network having a characteristic impedance which is matched to the load impedance of the treatment chamber 2 to obtain a maximal energy transfer to the food product 1. In the preservation method and apparatus described a so-called pulsed electric field can be used to obtain the varying electric field. A secondary, unwanted effect of the preservation treatment using a varying or pulsed electric field is that product is also heated up during the treatment. The heating of the product in a single treatment chamber of the type described above can reach 30° C. or more under normal operation. Heating the product causes a decrease of the load impedance of the treatment chamber. This impedance change results in a temperature dependent mismatch of the load impedance and the characteristic impedance of the output network. This means that the energy transfer between the voltage source with electrodes connected thereto and the treatment chamber is temperature dependent.

Figure 5:
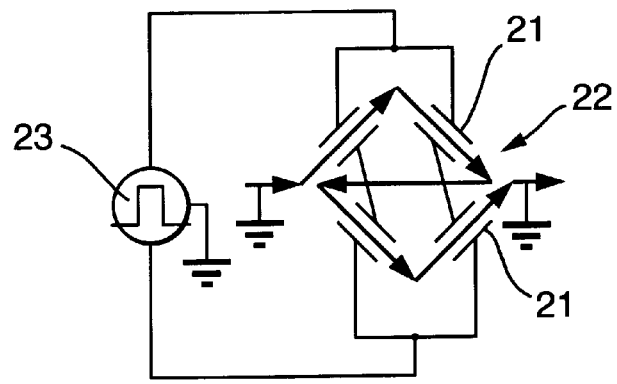
FIG. 5 shows in a very schematic manner an embodiment of the apparatus of the invention.

According to the present invention, this temperature dependent energy transfer can be prevented by using a treatment system with a plurality of treatment chambers which are electrically connected in a configuration resulting in a reduced impedance variation of the load impedance of the complete treatment system. In FIG. 5 a simplified schematic diagram of a treatment system is shown comprising four treatment chambers 21 electrically connected in a Wheatstone bridge configuration 22. The Wheatstone bridge 22 is connected to a voltage source with output network 23 adapted to generate electric pulses as schematically indicated. The treatment chambers 21 are series connected by pipes or the like, wherein the product flow is indicated by arrows.

The treatment chambers 21 can be of the type described and shown in FIGS. 2–4. However it should be understood that the implementation of the Wheatstone bridge configuration can be made using any type of treatment chambers.

The main advantage of this configuration is that the variation of the apparent impedance (resistance) of the bridge 22 due to the temperature effect is smaller than the variation of the resistance of a single treatment chamber. As a result, the load of the voltage source 23 is more constant than in case of one treatment chamber and consequently, the energy transfer is closer to the matched case.

Figure 6:
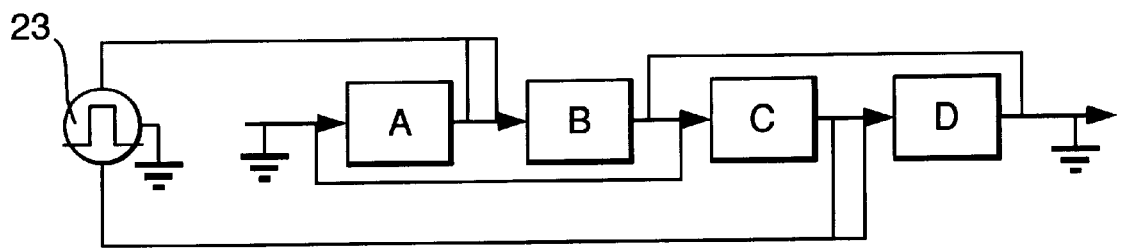
FIG. 6 shows an embodiment of the apparatus of FIG. using treatment chambers of the type shown in FIGS. 2–4.

In FIG. 6 an implementation of the Wheatstone bridge configuration is shown using the treatment chamber of the type of FIGS. 2–4, wherein the treatment chambers are schematically indicated as A, B, C, and D. The product flow and pipes connecting the treatment chambers are represented by arrows.

Figure 7:
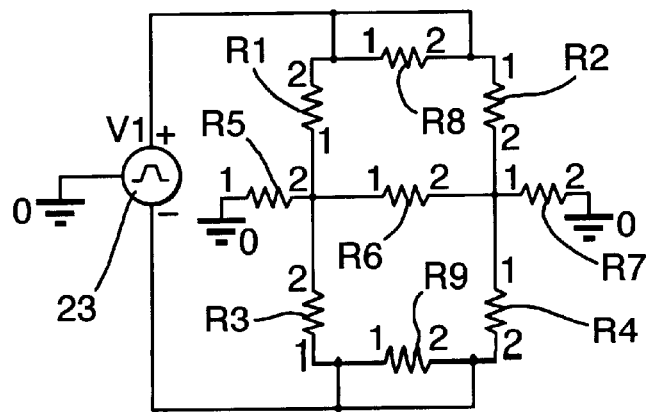
FIG. 7 shows an equivalent diagram of the Wheatstone bridge configuration of the treatment chambers of FIG. 6.

FIG. 7 shows the equivalent diagram of the bridge configuration of FIGS. 5 and 6. The impedance of the treatment chambers 21 is represented by R1, R2, R3, and R4. The entrance pipe is represented by R5, the pipes interconnecting the treatment chambers by R8, R6, R9 and the exit pipe by R7. For a proper operation of the electric circuit, the resistances R5–R9 should be much larger than the resistance of the treatment chambers R1–P4. Further, the electrical connections have to be made as close as possible to the treatment chambers.

To illustrate the reduction of the load resistance variation with the temperature, a comparison was made between a treatment system with one single treatment chamber and a system using four treatment chambers in the bridge configuration. The comparison is made under the assumption that the same energy is dissipated in the product in both cases, i.e., the starting product temperature and the outlet temperature are the same in both cases.

Based on the voltage and current pulse forms measured on the treatment system during normal operation, the calculation of the treatment chamber resistance was done. The results are shown in Table 1. Note that even for constant charging voltage, the actual experimental conditions for the product change.

TABLE 1

Estimated load resistance (Rload) for the CPS2 equipment.

Tin, C = 40    energy, J/ml, pulse = 18.78261    cnv, V/kA = 0.63

| wave nr. | freq., Hz | Tout, C | ΔT, C | Vpeak, kV | | Ipeak, kA | Rload, Ohm | energy/ml |
|---|---|---|---|---|---|---|---|---|
| 2 | 18 | 67.6 | 27.6 | 19.7 | 4.84 | 7.68254 | 2.564256198 | 338.087 |
| 3 | 16 | 65.3 | 25.3 | 20.1 | 4.74 | 7.52381 | 2.671518987 | 300.5217 |
| 4 | 14 | 61.6 | 21.6 | 20.4 | 4.58 | 7.269841 | 2.806113537 | 262.9565 |
| 5 | 12 | 59.1 | 19.1 | 20.4 | 4.58 | 7.269841 | 2.806113537 | 225.3913 |
| 6 | 10 | 55.8 | 15.8 | 20.7 | 4.47 | 7.095238 | 2.917449664 | 187.8261 |
| 7 | 8 | 52.4 | 12.4 | 20.7 | 4.37 | 6.936508 | 2.984210526 | 150.2609 |
| 8 | 6 | 49.5 | 9.5 | 21.2 | 4.32 | 6.857143 | 3.091666667 | 112.6957 |
| 9 | 4 | 45.7 | 5.7 | 21.7 | 4.26 | 6.761905 | 3.20915493 | 75.13043 |
| 10 | 2 | 43 | 3 | 21.6 | 4.11 | 6.52381 | 3.310948905 | 37.56522 |

The plot of the load resistance as a function of the temperature increase gives the following linear interpolation relation:

$$P_{load}(\Delta T) = R(T_{in}) - 0.0284 * \Delta T$$

where $R(T_{in})$ represents the value of the impedance in case no treatment is performed in the cell ($\Delta T=0$). $R(T_{in}=40°$ C.$)=3.3715$ Ω. This equation allows the estimation of the load resistance for any $\Delta T$.

Lets assume now that $\Delta T=20°$ C. Using the above equation, the resistance of the single load is $R_{equiv}(\Delta T=20)=2.0835$ Ω. For the bridge configuration it is necessary to assume $\Delta T=5°$ C. per cell to have the same overall heating effect over the four cells. The resistance of the individual branches of the bridge circuit will be $R_1=3.2295$ Ω, $R_2=3.0875$ Ω, $R_3=2.9455$ Ω, and $R_4=2.8035$ Ω. The equivalent resistance of the bridge is $R_{equiv}(\Delta T=20)=3.0148$ Ω. The results of the calculations of the equivalent resistance and of the relative variation with the temperature are given in Table 2. For comparison, also the calculations for a $\Delta T=40°$ C. are shown in Table 2. In the last column of Table 2 the calculations for the bridge configuration are given incase of a combination with cooling between the treatment chambers. It is thus assumed for this case that the temperature increase per treatment chamber is exactly compensated by cooling before the next treatment chamber.

TABLE 2

Comparison of the single chamber, bridge configuration, and bridge configuration combined with cooling between cells.

| | single chamber | bridge configuration | bridge configuration and cooling between chambers |
|---|---|---|---|
| $R(T_{in} = 40° C.)$ | 3.3715Ω | 3.3715Ω | 3.3715Ω |
| $R_{equiv}(\Delta T = 20)$ | 2.8035Ω | 3.0148Ω | 3.2295Ω |
| $\Delta R/R(T_{in})$ | 17% | 11% | 4.2% |
| $R(T_{in} = 40° C.)$ | 3.3715Ω | 3.3715Ω | 3.3715Ω |
| $R_{equiv}(\Delta T = 40)$ | 2.2355Ω | 2.654Ω | 3.0875Ω |
| $\Delta R/R(T_{in})$ | 34% | 21% | 8.4% |

The reduction of the temperature dependence of the voltage source load achieved by the implementation of the bridge configuration will be obvious based on the results given in Table 2. The results shown in the last column are even more promising from the electrical point of view, but at the price of including a heat exchanger between consecutive treatment chambers. Note that the calculations are based on the assumption that the four treatment chambers of the bridge configuration are identical to the treatment chamber used alone. Also note that for the example, the bridge configuration has to be operated at a quarter of the frequency needed for the single cell.

It is noted that the product is treated with bipolar pulses during the flow through the consecutive treatment chambers 21. Therefore, the Wheatstone bridge configuration can achieve a bipolar pulsed electric field treatment using a unipolar voltage source.

It will be understood by those skilled in the art that the embodiments described above are given by way of example only and that many additions and modifications are possible without departing from the scope of the present invention.

What is claimed is:

1. Method of preserving a food product, wherein the food product (1) is forced through a treatment system (2) having an entrance (3) and an exit (4) while a pressure difference of at least 10 MPa is substantially maintained between the entrance and the exit, wherein the product (1) is subjected to a varying electric and/or magnetic field, characterized in that a treatment system with a plurality of treatment chambers is used, wherein the treatment chambers are electrically connected to reduce impedance variations of the treatment system during the preserving of the food product, and wherein the treatment chambers are series connected for the food product flow.

2. Method according to claim 1, wherein four treatment chambers are used, the treatment chambers being electrically connected in a Wheatstone bridge configuration.

3. Method according to claim 1, wherein the food product is cooled between two successive treatment chambers.

4. Method according to claim 1, wherein the electric field extends in the lengthwise direction of a treatment chamber (2).

5. Method according to claim 1, wherein the electric field extends perpendicularly to the lengthwise direction of a treatment chamber (2).

6. Method according to claim 1, wherein the electric field is induced by a magnetic field.

7. Apparatus (10) for preserving food products, comprising at least one treatment system (2) having an entrance (3) and an exit (4), a high-pressure generating means (11) for forcing a product (1) through the treatment system, while substantially maintaining a pressure difference of at least 10 MPa between the entrance and the exit, and means (5) for generating a varying electric and/or magnetic field and for subjecting the product to the varying electric and/or magnetic field, characterized in that the treatment system comprises a plurality of treatment chambers (2) which are electrically interconnected to reduce impedance variations of the treatment system and which are series connected for the food product flow.

8. Apparatus according to claim 7, wherein the treatment system comprises four treatment chambers (2) electrically connected in a Wheatstone bridge configuration.

9. Apparatus according to claim 7, wherein means for cooling the food product are provided between two treatment chambers successive in the food product flow.

10. Apparatus according to claim 7, wherein the subjecting means comprises electrodes (5) positioned pairwise at opposing sides of each treatment chamber (2).

11. Apparatus according to claim 7, wherein the subjecting means comprises electrodes (5) positioned pairwise in the lengthwise direction of each treatment chamber (2), wherein the electrodes constitute wall sections of the treatment chamber (2) separated by insulators (7).

12. Apparatus according to claim 11, wherein the insulators (7) are provided with extending parts (8) narrowing the treatment chamber (2).

13. A food product preserved by the method according to claim 1.

* * * * *